(12) United States Patent
Kawahara

(10) Patent No.: US 9,400,537 B2
(45) Date of Patent: Jul. 26, 2016

(54) POWER SUPPLY IMPEDANCE OPTIMIZING APPARATUS

(71) Applicant: MegaChips Corporation, Osaka (JP)

(72) Inventor: Takashi Kawahara, Chiba (JP)

(73) Assignee: MegaChips Corporation, Osaka (JP)

( * ) Notice: Subject to any disclaimer, the term of this patent is extended or adjusted under 35 U.S.C. 154(b) by 0 days.

(21) Appl. No.: 14/599,040

(22) Filed: Jan. 16, 2015

(65) Prior Publication Data
US 2015/0200654 A1    Jul. 16, 2015

(30) Foreign Application Priority Data
Jan. 16, 2014   (JP) ................. 2014-005810

(51) Int. Cl.
*H03K 17/16* (2006.01)
*G06F 1/26* (2006.01)

(52) U.S. Cl.
CPC ..................... *G06F 1/263* (2013.01)

(58) Field of Classification Search
None
See application file for complete search history.

(56) References Cited

U.S. PATENT DOCUMENTS

| | | | |
|---|---|---|---|
| 2008/0106324 A1 | 5/2008 | Takemoto et al. | |
| 2009/0091370 A1 | 4/2009 | Kawasaki | |
| 2009/0096516 A1 | 4/2009 | Nakashima | |
| 2012/0182044 A1* | 7/2012 | Oh | G11C 5/063 326/30 |
| 2013/0307606 A1* | 11/2013 | Chen | H01L 29/7832 327/379 |
| 2013/0307607 A1* | 11/2013 | Oh | H03K 3/013 327/384 |
| 2014/0285232 A1* | 9/2014 | Oh | G11C 5/063 326/30 |

FOREIGN PATENT DOCUMENTS

| | | |
|---|---|---|
| JP | 2001-053231 A | 2/2001 |
| JP | 2008-076356 A | 4/2008 |
| JP | 2009-094133 A | 4/2009 |
| JP | 2009-099718 A | 5/2009 |

* cited by examiner

*Primary Examiner* — Long Nguyen
(74) *Attorney, Agent, or Firm* — Osha Liang LLP

(57) ABSTRACT

In a power supply impedance optimizing apparatus, first and second noise detecting circuits detect noises of first and second power supplies by magnetic field coupling between bonding wires of the first and second power supplies and bonding wires for first and second noise detection. A noise determining circuit determines a noise level using a frequency component in each of one or more frequency ranges as extracted from each of the noises of the first and second power supplies. The noise determining circuit controls ON/OFF state of the first switch connected between pads of the first and second power supplies and the second switch connected between pins of the first and second power supplies based on a determination result of the noise level.

13 Claims, 6 Drawing Sheets

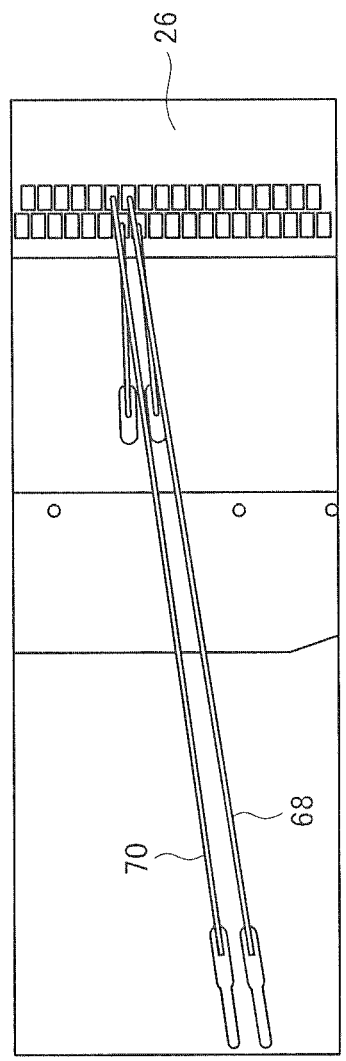
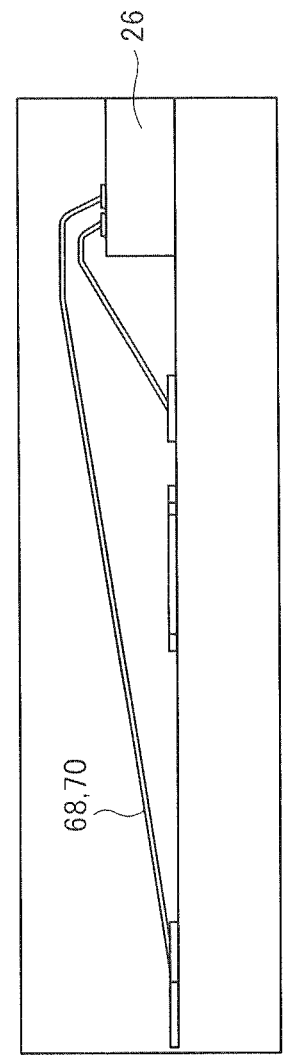
FIG. 3A
FIG. 3B

POWER SUPPLY IMPEDANCE OPTIMIZING APPARATUS

CROSS-REFERENCE TO RELATED APPLICATIONS

The present application claims priority under 35 U.S.C. §119 to Japanese Patent Application No. 2014-5810, filed on Jan. 16, 2014. The above application is hereby expressly incorporated by reference, in its entirety, into the present application.

BACKGROUND OF THE INVENTION

One or more embodiments of the present invention relate to a power supply impedance optimizing apparatus which optimizes impedance of a power supply of a printed board on which a semiconductor device is mounted.

On a semiconductor chip or in a package of a semiconductor device, power supplies are sometimes separated from each other so as to prevent the noise from sneaking between different types of power supplies. However, separation of power supplies tends to degrade impedance characteristics and, as a result, impedance of each power supply is often increased. However, in order to reduce the noise, it is desirable for a power supply to have a lower impedance.

Also, depending on an operating condition, there are some other cases where it is not necessary to separate the power supplies and it is desirable to lower impedance of a power supply for a particular frequency band only.

Conventionally, as described in JP 2001-53231 A, JP 2008-76356 A, JP 2009-94133 A, and JP 2009-99718 A, a power supply noise detecting circuit or the like is provided inside a semiconductor chip; the capacity necessary for a power supply is adjusted based on a noise level of the power supply; and impedance of the power supply is optimized in accordance with the operating condition.

JP 2001-53231 A describes a monitor pad which is connected to a power supply terminal and a ground terminal of a silicon chip of an LSI. Power supply noise is measured directly by bringing a probe into contact with the monitor pad to determine whether the LSI needs a decoupling capacitor or not.

JP 2008-76356 A describes that a mutual induction inductor pair consisting of a first inductor connected between power supply voltages of an integrated circuit and a second inductor which is opposed to the first inductor and at its both ends connected to external output terminals of the integrated circuit is provided in the integrated circuit, and power supply noise of the integrated circuit is measured based on a voltage waveform output from the second inductor through the external output terminal.

JP 2009-94133 A describes a method in which power supply impedance is switched according to varied potential applied to a circuit which performs a predetermined process, so as to allow a resonance frequency of a semiconductor integrated circuit to be separated from an operation frequency of the circuit which performs the predetermined process.

JP 2009-99718 A describes a method in which a plurality of decoupling cells are mounted, and the number of switches to be ON is controlled to thereby regulate the number of decoupling cells to be connected to a power supply based on the noise level of the power supply that varies depending on operating conditions of an internal circuit.

However, it becomes useless to separate power supplies because power supply impedance is reduced in all frequency ranges, which may result in the increase in sneak noise.

SUMMARY OF THE INVENTION

One or more embodiments of the present invention provide a power supply impedance optimizing apparatus capable of separating power supplies for a frequency range which is desired to be independent and reducing power supply impedance in a frequency range in which it is desired to reduce power supply impedance.

Additionally, one or more embodiments of the present invention provide a power supply impedance optimizing apparatus for optimizing impedance of a power supply of a printed board on which a semiconductor device is mounted, comprising:

a first noise detecting circuit adapted to detect noise of a first power supply by magnetic field coupling between a bonding wire of the first power supply and a bonding wire for first noise detection that is connected at a position adjacent to the bonding wire of the first power supply;

a second noise detecting circuit adapted to detect noise of a second power supply by magnetic field coupling between a bonding wire of the second power supply that has a same voltage as the first power supply and is separated from the first power supply and a bonding wire for second noise detection that is connected at a position adjacent to the bonding wire of the second power supply;

a first switch connected between a node of a pad of the first power supply and a node of a pad of the second power supply on a semiconductor chip of the semiconductor device;

a second switch connected between a lead of a pin of the first power supply and a lead of a pin of the second power supply in a package of the semiconductor device; and a noise determining circuit adapted to determine a noise level of a frequency component in each of one or more frequency ranges using the frequency component in each of the one or more frequency ranges as extracted from each of the noise of the first power supply and the noise of the second power supply and control ON/OFF state of the first switch and the second switch based on a determination result of the noise level.

In one or more embodiments of the present invention, the ON/OFF state of the first switches and the second switches is controlled based on the noise level of a frequency component in each frequency range that is generated according to the operation status of the circuit. In other words, a point (merging point) connecting between the power supply line of the first power supply and the power supply line of the second power supply is changed, and the connection between the power supply line of the first power supply and the power supply line of the second is established or cut off.

As a result, the power supply impedance varies based on the noise level so that the power supply impedance is constantly optimized. Therefore, the noise of the entire system can be reduced and the operating margin can be increased. In addition, because the frequency range in which the power supply impedance can be reduced is changed according to the merging point, the power supplies can be separated for a frequency range which is desired to be independent, and the power supply impedance can be reduced in a frequency range in which it is desired to reduce the power supply impedance.

BRIEF DESCRIPTION OF THE DRAWINGS

FIGS. 3A and 3B are a top view and a side view each showing an exemplary configuration of a noise detecting circuit according to one or more embodiments of the present invention.

DETAILED DESCRIPTION OF THE INVENTION

Hereinafter, a power supply impedance optimizing apparatus according to one or more embodiments of the present invention will be described in detail.

Figure 1:
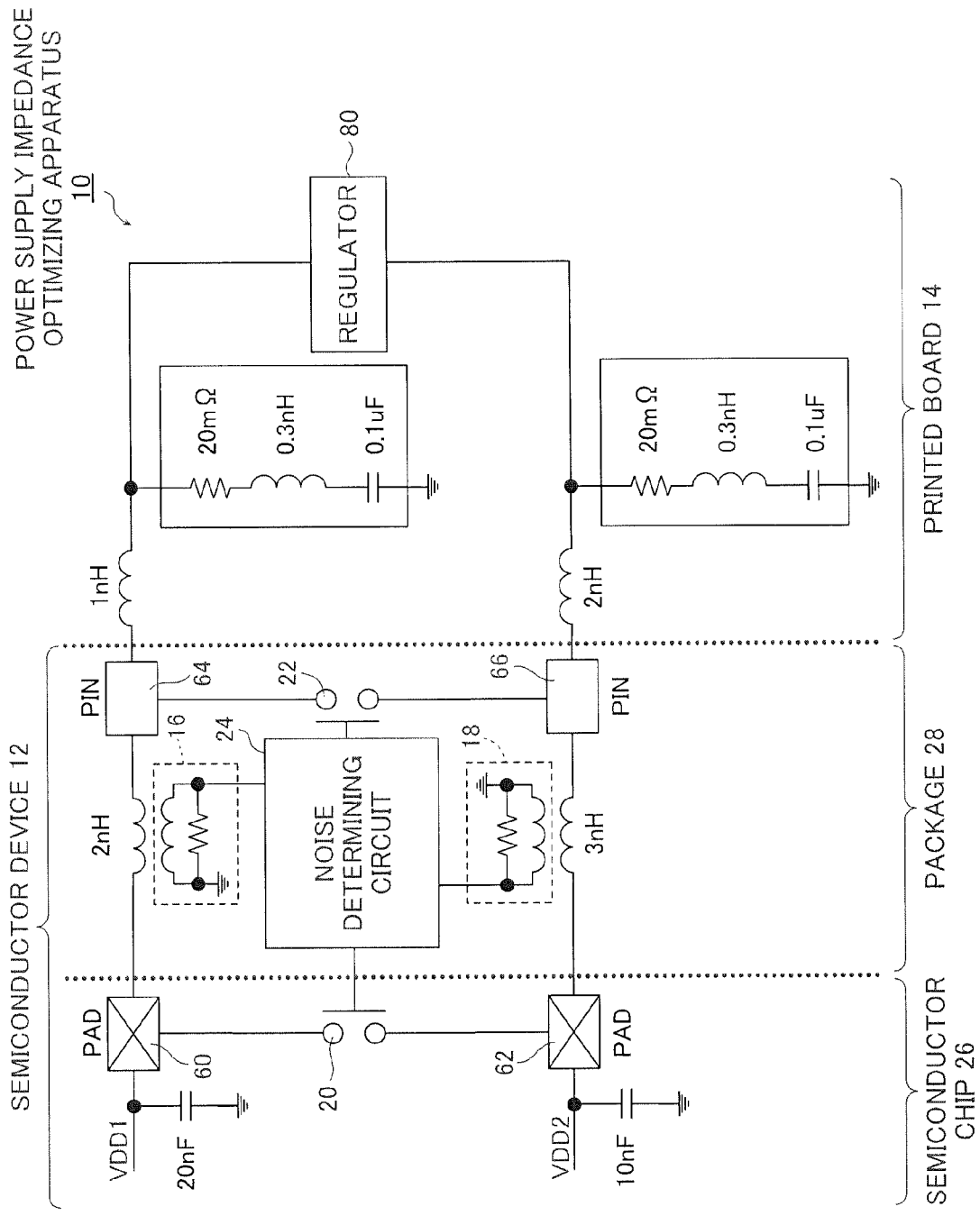
FIG. 1 is a circuit diagram of one or more embodiments of the present invention showing a configuration of a power supply impedance optimizing apparatus.

FIG. 1 is a circuit diagram showing a configuration of a power supply impedance optimizing apparatus according to one or more embodiments of the present invention. A power supply impedance optimizing apparatus 10 shown in FIG. 1 is to optimize impedance of power supplies by switching the connection or disconnection status between two separated power supply lines in a printed board 14 on which a semiconductor device 12 is mounted. The power supply impedance optimizing apparatus 10 includes two noise detecting circuits 16 and 18, two switches 20 and 22, and a noise determining circuit 24.

The noise detecting circuits 16 and 18 are located in a package 28 of the semiconductor device 12.

The noise detecting circuit 16 can detect noise of a first power supply VDD1 by means of magnetic field coupling (mutual coupling) between a bonding wire of the first power supply VDD1 to which a predetermined power supply voltage is supplied from a regulator 80 shown in FIG. 1 and a bonding wire for first noise detection which is connected at a position adjacent to the bonding wire of the first power supply VDD1.

The noise detecting circuit 18 is supplied with the same power supply voltage as that for the first power supply VDD1 from the regulator 80 and is to detect noise of a second power supply VDD2 by means of magnetic field coupling between a bonding wire of the second power supply VDD2 which is separated from the first power supply VDD1 and a bonding wire for second noise detection which is connected at a position adjacent to the bonding wire of the second power supply VDD2.

FIG. 1 shows, as a simulation model of the bonding wire of the first power supply VDD1, an inductance component connected between a pad 60 of a semiconductor chip 26 and a pin 64 of the package 28 in the semiconductor device 12 and as a simulation model of the bonding wire for first noise detection, a mutual induction circuit (magnetic coupling circuit) having inductance and resistance components connected in parallel with one terminal being connected to the ground and the other terminal being short-circuited. The result of noise detection is output from the other terminal of the mutual induction circuit. The same is true for the second power supply VDD2.

FIGS. 3A and 3B are a top view and a side view each showing an exemplary configuration according to one or more embodiments of the noise detecting circuit. FIGS. 3A and 3B show an example in which the semiconductor chip 26 having pads arranged in two rows in a zigzag manner, namely zigzag pads.

As shown in FIGS. 3A and 3B, the noise detecting circuit 16 is formed of a bonding wire 70 for first noise detection which is connected at a position adjacent to a bonding wire 68 of the first power supply VDD1, the bonding wire 68 being originally disposed in the semiconductor device 12.

The bonding wire 68 of the first power supply VDD1 is connected between a pad of the semiconductor chip 26 and a finger of the package 28, the pad and the finger corresponding to the first power supply VDD1.

The bonding wire 70 for first noise detection is connected between a pad adjacent to the pad corresponding to the first power supply VDD1 on the semiconductor chip 26 and a finger adjacent to the finger corresponding to the first power supply VDD1 in the package 28.

Figure 4:
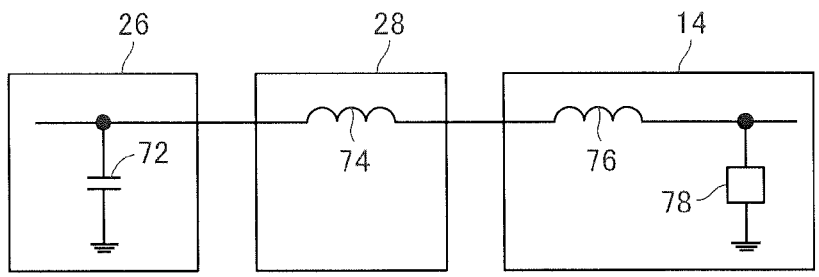
FIG. 4 is a circuit diagram showing an exemplary configuration of simulation models of a power supply line of a printed board on which a semiconductor device is mounted according to one or more embodiments of the present invention.

FIG. 4 is a circuit diagram showing an exemplary configuration according to one or more embodiments of simulation models of the power supply line of the printed board on which the semiconductor device is mounted. As shown in FIG. 4, the simulation model of the power supply line of the semiconductor device 12 is illustrated as a capacitance component 72 connected between the power supply line and the ground line. Also, the simulation models of the power supply line of the package 28 and the printed board 14 are illustrated as inductance components 74 and 76 connected in series with the power supply line.

In addition, in FIG. 4, a simulation model of a decoupling capacitor 78 is illustrated. The simulation model of the decoupling capacitor 78 is constituted by a resistance component, an inductance component and a capacitance component connected between the power supply line and the ground line in series as shown in FIG. 1. In FIG. 1, typical values for each component are shown.

The power supply line of the package 28 includes a bonding wire having pure inductive characteristics. Because two bonding wires are arranged in parallel to be adjacent to each other as shown in FIG. 3A, the degree of coupling of the magnetic field coupling between those two bonding wires is significantly high. Therefore, the noise detecting circuit 16 can detect noise of the first power supply VDD1 by using the magnetic field coupling between the two bonding wires which are the bonding wire of the first power supply VDD1 and the bonding wire for first noise detection.

Direct probing, a typical method for noise detection, has a disadvantage in that an additional load is applied to the circuit.

Compared to this, the magnetic field coupling of two bonding wires has an advantage in that no load is applied to the circuit and, therefore, the influence on the circuit operation is significantly smaller than in direct probing. In addition, due to the positional relationship between the two bonding wires that are connected to be adjacent to each other, the degree of coupling is significantly high, so that noise of the first power supply VDD1 can be effectively detected.

As a similar method, a method of detecting the noise of the first power supply VDD1 through capacitive coupling (mutual coupling) may be considered. However, for the capacitive coupling, a large capacitance value is necessary, high voltage is also necessary, and it is difficult to detect noise at low frequency. Therefore, the magnetic field coupling is more preferable.

Meanwhile, in the case of the zigzag pads like as in this example, as shown in FIG. 3B, a bonding wire corresponding to a pad in the outer row on the semiconductor chip 26 is connected to a finger located near the semiconductor chip 26, while a bonding wire corresponding to a pad in the inner row is connected to a finger located further from the semiconductor chip 26 compared to the bonding wire corresponding to the pad in the outer row. In addition, the height of the bonding wire corresponding to the pad of the outer row is different from the height of the bonding wire corresponding to the pad of the inner row.

Therefore, even though the pad in the outer row and the pad in the inner row are adjacent to each other, because the bonding wire corresponding to the pad in the outer row and the bonding wire corresponding to the pad in the inner row are not adjacent to each other, the degree of coupling between the bonding wires are not so high.

In contrast, the bonding wires corresponding to two adjacent pads both in the inner row or the bonding wires corresponding to two adjacent pads both in the outer row exhibit a very high degree of coupling because the bonding wires themselves are also adjacent to each other.

Therefore, in the case of the zigzag pads, it is desirable to use two bonding wires corresponding to two adjacent pads both in the outer row or two adjacent pads both in the inner row so that the degree of coupling between the bonding wires is high.

The same is true for the noise detecting circuit 18.

It should be noted that the pad and the pin to which the bonding wire for first noise detection is connected may be a pad and a pin for dedicated use. Alternatively, a pad and a pin for normal operation of the semiconductor device 12 as well as a pad and a pin having a fixed DC level, like a pin in a control system, may be shared.

The switches 20 and 22 are to connect (merge) the power supply line of the first power supply VDD1 and the power supply line of the second power supply VDD2.

The switch 20 is located on the semiconductor chip 26 and connected between the pad 60 of the first power supply VDD1 and a pad 62 of the second power supply VDD2.

The switch 22 is located in the package 28 and connected between the pin 64 of the first power supply VDD1 and a pin 66 of the second power supply VDD2.

The ON/OFF state of the switches 20 and 22 is controlled based on the determination results of noise levels of the first and second power supplies VDD1 and VDD2 provided by the noise determining circuit 24 to be described later.

When the switch 20 is put to the ON position, the pad 60 of the first power supply VDD1 and the pad 62 of the second power supply VDD2 are connected. When the switch 22 is put to the ON position, the pin 64 of the first power supply VDD1 and the pin 66 of the second power supply VDD2 are connected.

Figure 5A:
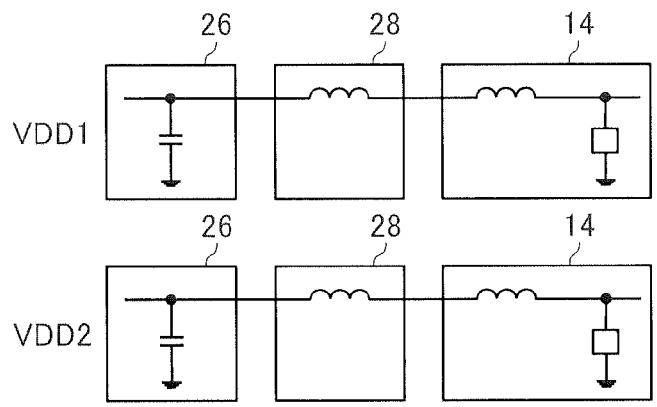
FIGS. 5A, 5B and 5C are conceptual diagrams showing, as an example of one or more embodiments of the present invention, the state where a first power supply VDD1 and a second power supply VDD2 are completely separated, the state where they are connected together between pads of a semiconductor chip and the state where they are connected together between pins of a package, respectively.
Figure 5B:
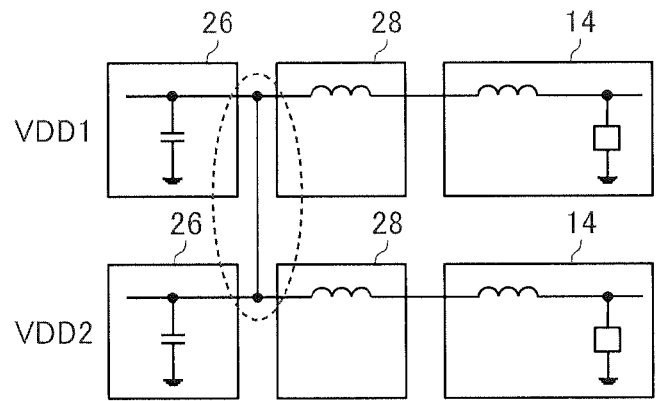
Figure 5C:
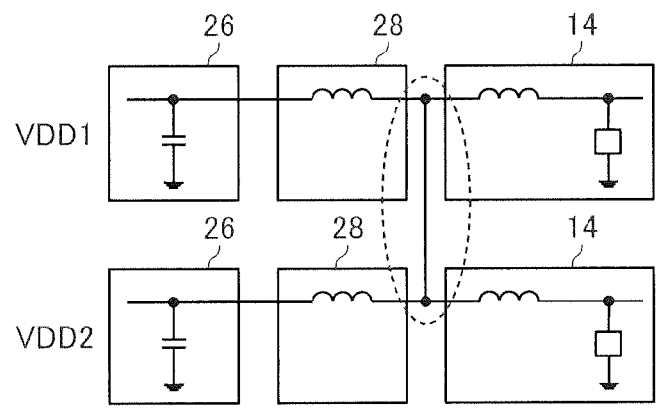

FIGS. 5A, 5B and 5C are conceptual diagrams showing, as an example of one or more embodiments of the present invention, the state where the first power supply VDD1 and the second power supply VDD2 are completely separated, the state where they are connected together between pads of the semiconductor chip and the state where they are connected together between pins of the package, respectively. The locations where the power supply line of the first power supply VDD1 and the power supply line of the second power supply VDD2 are to be connected can be roughly classified into the following two: a location between adjacent pads of the semiconductor chip 26; and a location between adjacent pins of the package 28, as shown in FIGS. 5B and 5C.

Figure 6:
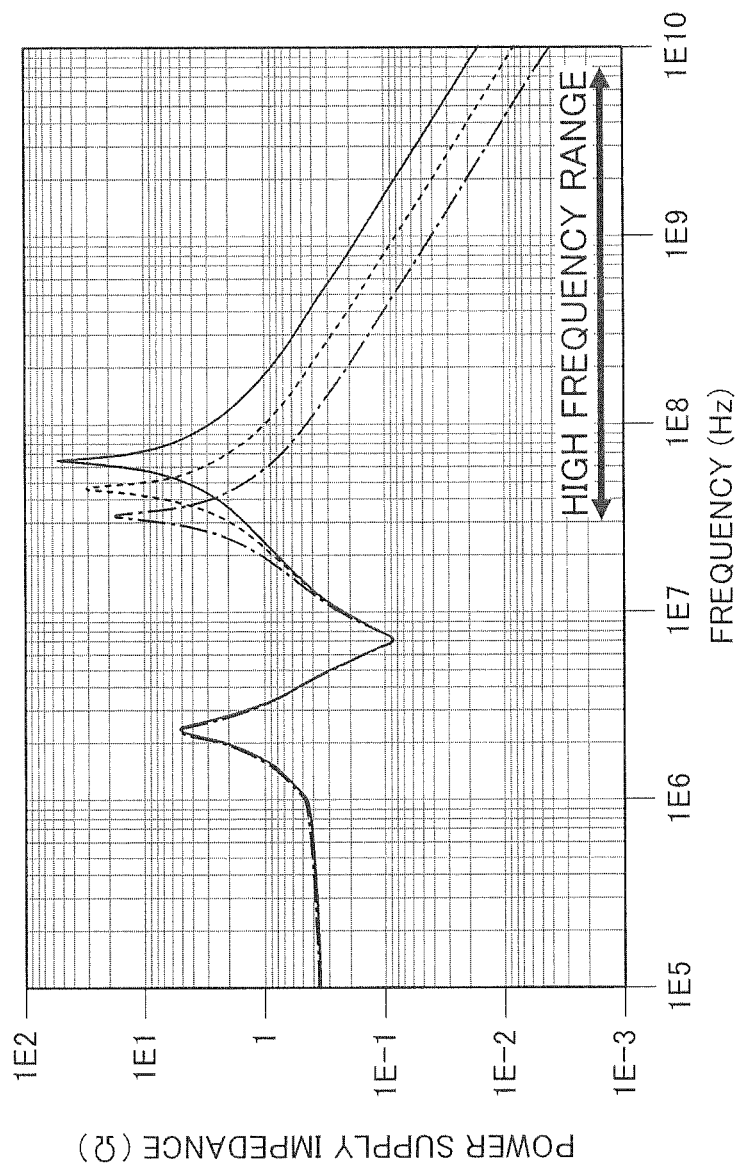
FIG. 6 is a graph showing an exemplary relationship between power supply impedance and frequency with a capacitance value of a capacitance component of the power supply line of the semiconductor chip being changed according to one or more embodiments of the present invention.

FIG. 6 is a graph showing one or more embodiments of an exemplary relationship between power supply impedance and frequency with a capacitance value of a capacitance component of the power supply line of the semiconductor chip being changed.

In the case of the simulation model shown in FIG. 4, the power supply impedance over the entire printed board 14 on which the semiconductor device 12 is mounted is taken as the center as indicated by a dashed line in FIG. 6. When the capacitance component of the power supply line of the semiconductor chip 26 is increased, the power supply impedance in a high frequency range decreases as indicated by a dashed-dotted line, and when the capacitance component of the power supply line is decreased, the power supply impedance in the high frequency range increases as indicated by a solid line.

Therefore, when the power supply line of the first power supply VDD1 and the power supply line of the second power supply VDD2 are connected together between pads, the combined capacitance component becomes larger, thereby enabling to reduce the power supply impedance.

Although not shown in the drawings, when the value of the inductance component of the power supply line of the package 28 is decreased, the power supply impedance in the range of approximately several tens of MHz reduces, while when the value of the inductance component is increased, the power supply impedance in the range of approximately several tens of MHz increases.

Therefore, when the power supply line of the first power supply VDD1 and the power supply line of the second power supply VDD2 are connected together between pins, the combined inductance component becomes smaller, thereby enabling to reduce the power supply impedance.

When the value of the inductance component of the power supply line of the printed board 14 is decreased, the power supply impedance in the range of approximately several tens of MHz reduces, while when the value of the inductance component is increased, the power supply impedance in the range of approximately several tens of MHz increases.

When the capacitance value of the decoupling capacitor of the printed board 14 is increased, the power supply impedance in the range of approximately several MHz reduces, while when the capacitance value of the decoupling capacitor is decreased, the power supply impedance in the range of approximately several MHz increases.

In addition, in the case where there is a comprehensive power supply impedance difference between the two power supply lines, when the power supply lines are connected together between two adjacent pads on the semiconductor chip 26, the power supply impedance can be reduced over all the frequency range including the high frequency range. When the power supply lines are connected together between two adjacent pins in the package 28, the power supply impedance can be reduced only in the low frequency range.

Thus, the power supply impedance can be reduced only in a particular frequency range by selecting the place where the power supply lines are connected together between pads or between pins.

It should be noted that the connection of the power supply lines between pads may be established between the pads 60 and 62 or by using, on the semiconductor chip 26, any points at nodes on the power supply lines extending from the pads 60, 62. Similarly, the connection of the power supply lines between pins may be established between the pins 64 and 66 or by using, in the package 28, any points at leads of the power supply lines. Thus, the locations at which the switches 20 and 22 are placed can be determined appropriately. Also, it is possible to change the frequency range in which the power supply impedance can be reduced by changing the location at which the switches 20 and 22 are placed.

In addition, two or more switches may be provided on the semiconductor chip 26 in nodes on the power supply lines extending from the pads 60 and 62 and also in leads of the power supply lines in the package 28.

The noise determining circuit 24 determines noise levels of frequency components in two frequency ranges using the frequency components in the two frequency ranges as extracted from the noise of the first power supply VDD1 and the noise of the second power supply VDD2, the noises being respectively detected by the noise detecting circuits 16 and 18, and controls the ON/OFF state of the first and second switches 20 and 22 based on the determination results. The noise determining circuit 24 is located in the package 28.

Figure 2:
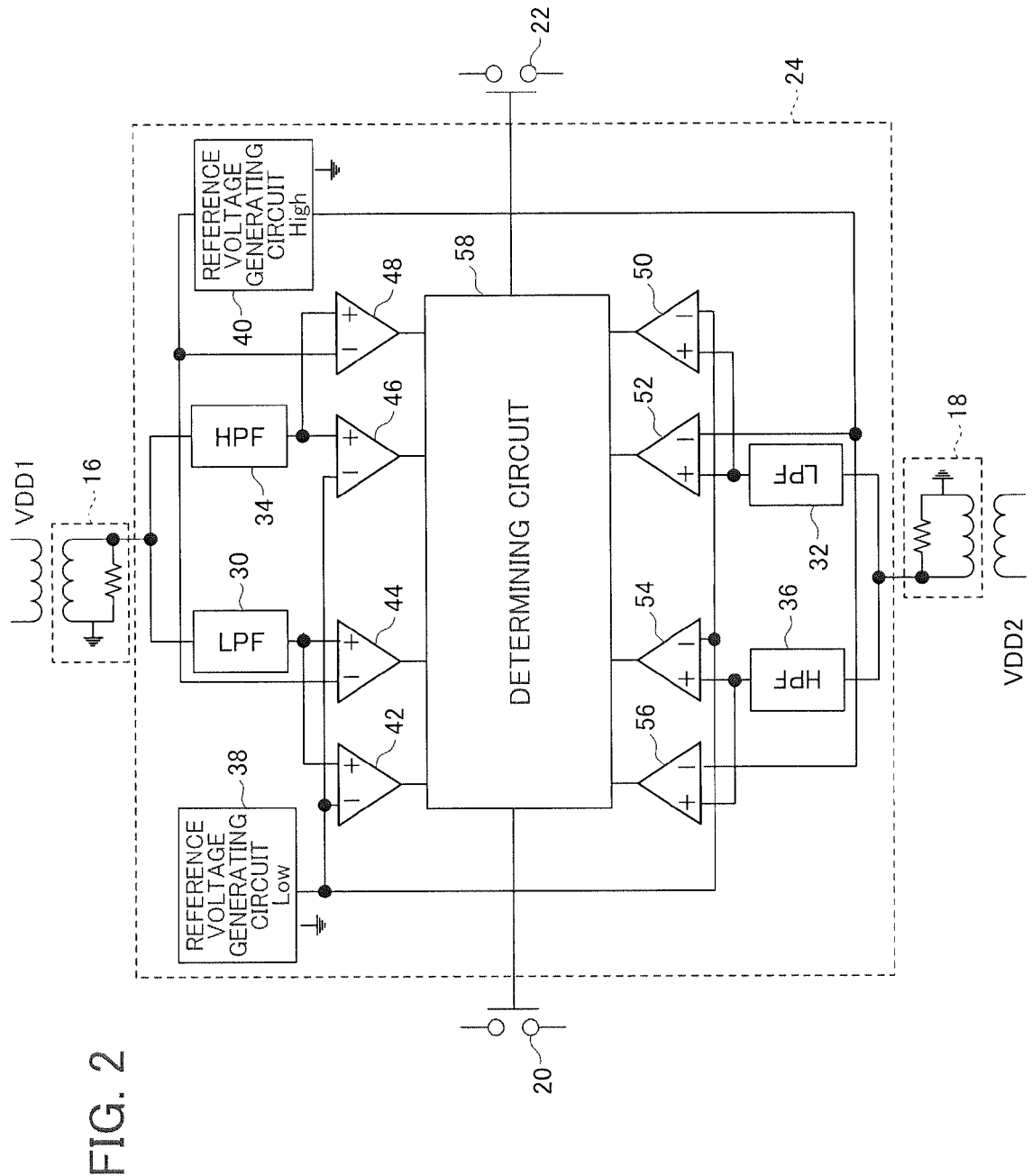
FIG. 2 is a circuit diagram showing an exemplary configuration of a noise determining circuit according to one or more embodiments shown in FIG. 1.

FIG. 2 is a circuit diagram showing an exemplary configuration of the noise determining circuit shown in FIG. 1. The noise determining circuit 24 shown in FIG. 2 includes two low pass filters (LPFs) 30 and 32, two high pass filters (HPFs) 34 and 36, two reference voltage generating circuits 38 and 40, eight comparators 42, 44, 46, 48, 50, 52, 54 and 56, and a determining circuit 58.

The LPFs 30 and 32 and the HPFs 34 and 36 are to extract frequency components in the above-described two frequency ranges from the noise of the first power supply VDD1 and the noise of the second power supply VDD2.

The LPFs 30 and 32 extract frequency components (low frequency components) in a frequency range lower than a predetermined frequency set in advance from the noise of the first power supply VDD1 and the noise of the second power supply VDD2, respectively.

The HPFs 34 and 36 extract frequency components (high frequency components) in a frequency range higher than the predetermined frequency set in advance from the noise of the first power supply VDD1 and the noise of the second power supply VDD2, respectively.

The reference voltage generating circuits 38 and 40 are to generate a first reference voltage (Low-side reference voltage) and a second reference voltage (High-side reference voltage) which is higher than the first reference voltage to thereby determine the noise levels of the first power supply VDDD1 and the second power supply VDD2, respectively.

For example, when the voltages of the first power supply VDD1 and the second power supply VDD2 are 1.2 V, voltages of 1.3 V and 1.4 V, which are higher than 1.2 V, are generated as the first and second reference voltages, respectively.

The comparators 42 and 44 compare the voltage of the low frequency component of the noise of the first power supply VDD1 with the first and second reference voltages, respectively.

The comparators 46 and 48 compare the voltage of the high frequency component of the noise of the first power supply VDD1 with the first and second reference voltages, respectively.

The comparators 50 and 52 compare the voltage of the low frequency component of the noise of the second power supply VDD2 with the first and second reference voltages, respectively.

The comparators 54 and 56 compare the voltage of the high frequency component of the noise of the second power supply VDD2 with the first and second reference voltages, respectively.

The comparator 42 generates H (high level) when the voltage of the low frequency component of the noise of the first power supply VDD1 is higher than the first reference voltage, and generates L (low level) when the voltage of the low frequency component of the noise of the first power supply VDD1 is lower than the first reference voltage.

The comparator 44 generates H when the voltage of the low frequency component of the noise of the first power supply VDD1 is higher than the second reference voltage, and generates L when the voltage of the low frequency component of the noise of the first power supply VDD1 is lower than the second reference voltage. The same is true for other comparators 46, 48, 50, 52, 54 and 56.

The determining circuit 58 determines the noise levels of the frequency components in the above-described two frequency ranges based on the comparison results of the comparators 42, 44, 46, 48, 50, 52, 54 and 56 and controls the ON/OFF state of the switches 20 and 22 based on the determination results.

TABLE 1

| HPF | VDD1 | | VDD2 | | SW | |
| --- | --- | --- | --- | --- | --- | --- |
| | CMP4 | CMP3 | CMP8 | CMP7 | PAD | PIN |
| | 0 | 0 | 0 | 0 | off | off |
| | 0 | 0 | 0 | 1 | on | on/off |
| | 0 | 1 | 0 | 0 | on | on/off |
| | 0 | 1 | 0 | 1 | on | on/off |
| | 0 | 1 | 1 | 1 | off | off |
| | 1 | 1 | 0 | 1 | off | off |
| | 1 | 1 | 1 | 1 | off | off |

As shown in Table 1, when the comparison results of the comparators 48, 46, 56 and 54 (CMP4, CMP3, CMP8 and CMP7) associated with the HPFs 34 and 36 are 0, 0, 0 and 0, the determining circuit 58 of the embodiment shown determines that the noises of the first and second power supplies VDD1 and VDD2 on the high frequency side (for example, 5 MHz or higher) are both at low level (at which the voltage is lower than the first reference voltage), and puts the switches (SW) 20 and 22 on the pad (PAD) side and pin (PIN) side to the OFF position (off).

When the comparison results of the comparators 48, 46, 56 and 54 (CMP4, CMP3, CMP8 and CMP7) are 0, 0, 0 and 1, the determining circuit 58 determines that the noise of the first power supply VDD1 on the high frequency side is at low level while the noise of the second power supply VDD2 on the high frequency side is at middle level (at which the voltage is equal to or higher than the first reference voltage but equal to or lower than the second reference voltage), and puts the switch 20 on the pad side to the ON position (on) and the switch 22 on the pin side to the ON or OFF position (on/off).

Whether the switch 22 on the pin side is put to the ON or OFF position may be appropriately determined according to the comparison results of the comparators 42, 44, 50 and 52 (CMP1, CMP2, CMP5 and CMP6) associated with the LPFs 30 and 32, the effect of noise reduction, and the like.

When the comparison results of the comparators 48, 46, 56 and 54 (CMP4, CMP3, CMP8 and CMP7) are 0, 1, 0 and 0, the determining circuit 58 determines that the noise of the first power supply VDD1 on the high frequency side is at middle level while the noise of the second power supply VDD2 on the high frequency side is at low level, and puts the switch 20 on the pad side to the ON position and the switch 22 on the pin side to the ON or OFF position.

When the comparison results of the comparators 48, 46, 56 and 54 (CMP4, CMP3, CMP8 and CMP7) are 0, 1, 0 and 1, the determining circuit 58 determines that the noise of the first power supply VDD1 on the high frequency side and the noise of the second power supply VDD2 on the high frequency side are both at middle level, and puts the switch 20 on the pad side to the ON position and the switch 22 on the pin side to the ON or OFF position.

When the comparison results of the comparators 48, 46, 56 and 54 (CMP4, CMP3, CMP8 and CMP7) are 0, 1, 1 and 1, the determining circuit 58 determines that the noise of the first power supply VDD1 on the high frequency side is at middle level while the noise of the second power supply VDD2 on the high frequency side is at high level (at which the voltage is equal to or higher than the second reference voltage), and puts the switches 20 and 22 on the pad and pin sides to the OFF position.

When the comparison results of the comparators 48, 46, 56 and 54 (CMP4, CMP3, CMP8 and CMP7) are 1, 1, 0 and 1, the determining circuit 58 determines that the noise of the first power supply VDD1 on the high frequency side is at high level while the noise of the second power supply VDD2 on the high frequency side is at middle level, and puts the switches 20 and 22 on the pad and pin sides to the OFF position.

When the comparison results of the comparators 48, 46, 56 and 54 (CMP4, CMP3, CMP8 and CMP7) are 1, 1, 1 and 1, the determining circuit 58 determines that the noises of the first and second power supplies VDD1 and VDD2 on the high frequency side are both at high level, and puts the switches 20 and 22 on the pad and pin sides to the OFF position.

TABLE 2

| LPF | VDD1 | | VDD2 | | SW | |
|---|---|---|---|---|---|---|
| | CMP2 | CMP1 | CMP6 | CMP5 | PAD | PIN |
| | 0 | 0 | 0 | 0 | off | off |
| | 0 | 0 | 0 | 1 | on/off | on |
| | 0 | 1 | 0 | 0 | on/off | on |
| | 0 | 1 | 0 | 1 | on/off | on |
| | 0 | 1 | 1 | 1 | off | off |
| | 1 | 1 | 0 | 1 | off | off |
| | 1 | 1 | 1 | 1 | off | off |

As shown in Table 2, when the comparison results of the comparators 44, 42, 52 and 50 (CMP2, CMP1, CMP6 and CMP5) associated with LPFs 30 and 32 are 0, 0, 0 and 0, the determining circuit 58 determines that the noises of the first and second power supplies VDD1 and VDD2 on the low frequency side (for example, 5 MHz or lower) are both at low level, and puts the switches (SW) 20 and 22 on the pad and pin sides to the OFF position.

When the comparison results of the comparators 44, 42, 52 and 50 (CMP2, CMP1, CMP6 and CMP5) are 0, 0, 0 and 1, the determining circuit 58 determines that the noise of the first power supply VDD1 on the low frequency side is at low level while the noise of the second power supply VDD2 on the low frequency side is at middle level, and puts the switch 20 on the pad side to the ON or OFF position and the switch 22 on the pin side to the ON position.

Whether the switch 20 on the pad side is put to the ON or OFF position may be appropriately determined according to the comparison results of the comparators 48, 46, 56 and 54 (CMP4, CMP3, CMP8 and CMP7) associated with the HPFs 34 and 36, the effect of noise reduction, and the like.

When the comparison results of the comparators 44, 42, 52 and 50 (CMP2, CMP1, CMP6 and CMP5) are 0, 1, 0 and 0, the determining circuit 58 determines that the noise of the first power supply VDD1 on the low frequency side is at middle level while the noise of the second power supply VDD2 on the low frequency side is at low level, and puts the switch 20 on the pad side to the ON or OFF position and the switch 22 on the pin side to the ON position.

When the comparison results of the comparators 44, 42, 52 and 50 (CMP2, CMP1, CMP6 and CMP5) are 0, 1, 0 and 1, the determining circuit 58 determines that the noises of the first and second power supplies VDD1 and VDD2 on the low frequency side are both at middle level, and puts the switch 20 on the pad side to the ON or OFF position and the switch 22 on the pin side to the ON position.

When the comparison results of the comparators 44, 42, 52 and 50 (CMP2, CMP1, CMP6 and CMP5) and 0, 1, 1 and 1, the determining circuit 58 determines that the noise of the first power supply VDD1 on the low frequency side is at middle level while the noise of the second power supply VDD2 on the low frequency side is at high level, and puts the switches 20 and 22 on the pad and pin sides to the OFF position.

When the comparison results of the comparators 44, 42, 52 and 50 (CMP2, CMP1, CMP6 and CMP5) are 1, 1, 0 and 1, the determining circuit 58 determines that the noise of the first power supply VDD1 on the low frequency side is at high level while the noise of the second power supply VDD2 on the low frequency side is at middle level, and puts the switches 20 and 22 on the pad and pin sides to the OFF position.

When the comparison results of the comparators 44, 42, 52 and 50 (CMP2, CMP1, CMP6 and CMP5) are 1, 1, 1 and 1, the determining circuit 58 determines that the noises of the first and second power supplies VDD1 and VDD2 on the low frequency side are both at high level, and puts the switches 20 and 22 on the pad and pin sides to the OFF position.

That is, when the noises of the first and second power supplies VDD1 and VDD2 are both at low level, the determining circuit 58 of the present embodiment determines that it is not necessary to connect the power supply lines.

When the noise of at least either one of the power supplies is at middle level, the determining circuit 58 determines that the noise reduction can be achieved by connecting the power supply lines to thereby lower the power supply impedance, and therefore connects the power supply lines through one of the switches, and optionally, also through the other thereof.

When the noise of at least either one of the power supplies is at high level, the determining circuit 58 determines that upon connection of the power supply lines, the noise of one of the power supplies may sneak into the other thereof disadvantageously, and therefore does not connect the power supply lines.

It should be noted that how the determining circuit 58 determines the noise levels of the first and second power supplies VDD1 and VDD2 based on the comparison results of the comparators 42, 44, 46, 48, 50, 52, 54 and 56 and how the switches 20 and 22 on the pad and pin sides are put to the ON or OFF position, may be defined appropriately as required.

Also, in the case of extracting a frequency component, the frequency component may be extracted by dividing the frequency range into one or more stages for each of the noise of the first power supply VDD1 and the noise of the second power supply VDD2 with the use of the LPFs, band pass filters (BPFs) and the HPFs. By increasing the number of divisions of the frequency range, the power supply impedance in each division of the frequency range can be controlled to be reduced.

The number of the reference voltages is not limited to two, such as the first and second reference voltages, and may be one or three or more. By increasing the number of the reference voltages, the noise level can be accurately determined.

In addition, the noise determining circuit 24 may be located on the semiconductor chip 26.

Next, the operation of the power supply impedance optimizing apparatus 10 will be described.

The noise of the first power supply VDD1 and the noise of the second power supply VDD2 are constantly detected by the noise detecting circuits 16 and 18, respectively.

By using the low frequency component on the side of LPFs 30 and 32 and the high frequency component on the side of HPFs 34 and 36 as extracted from the noise of the first power supply VDD1 and the noise of the second power supply VDD2, the noise determining circuit 24 determines the noise levels of the low frequency components and the high frequency components, and controls the ON/OFF state of the switches 20 and 22 based on the determination results of the noise levels.

That is, in the printed board 14 on which the semiconductor device 12 is mounted, the ON/OFF state of the switches 20 and 22 is controlled based on the noise level of a frequency component in each frequency range that is generated according to the operation status of the circuit. In other words, a merging point between the power supply line of the first power supply VDD1 and the power supply line of the second power supply VDD2 is changed, and the connection between the power supply line of the first power supply VDD1 and the power supply line of the second is established or cut off.

As a result, the power supply impedance varies based on the noise level so that the power supply impedance is constantly optimized. Therefore, the noise of the entire system can be reduced and the operating margin can be increased. In addition, since the frequency range in which the power supply impedance can be reduced is changed according to the merging point, the power supplies can be separated for a frequency range which is desired to be independent, and the power supply impedance can be reduced in a frequency range in which it is desired to reduce the power supply impedance.

Finally, results of simulations carried out by inputting the noise to the power supply impedance optimizing apparatus 10 will be explained.

Figure 7:
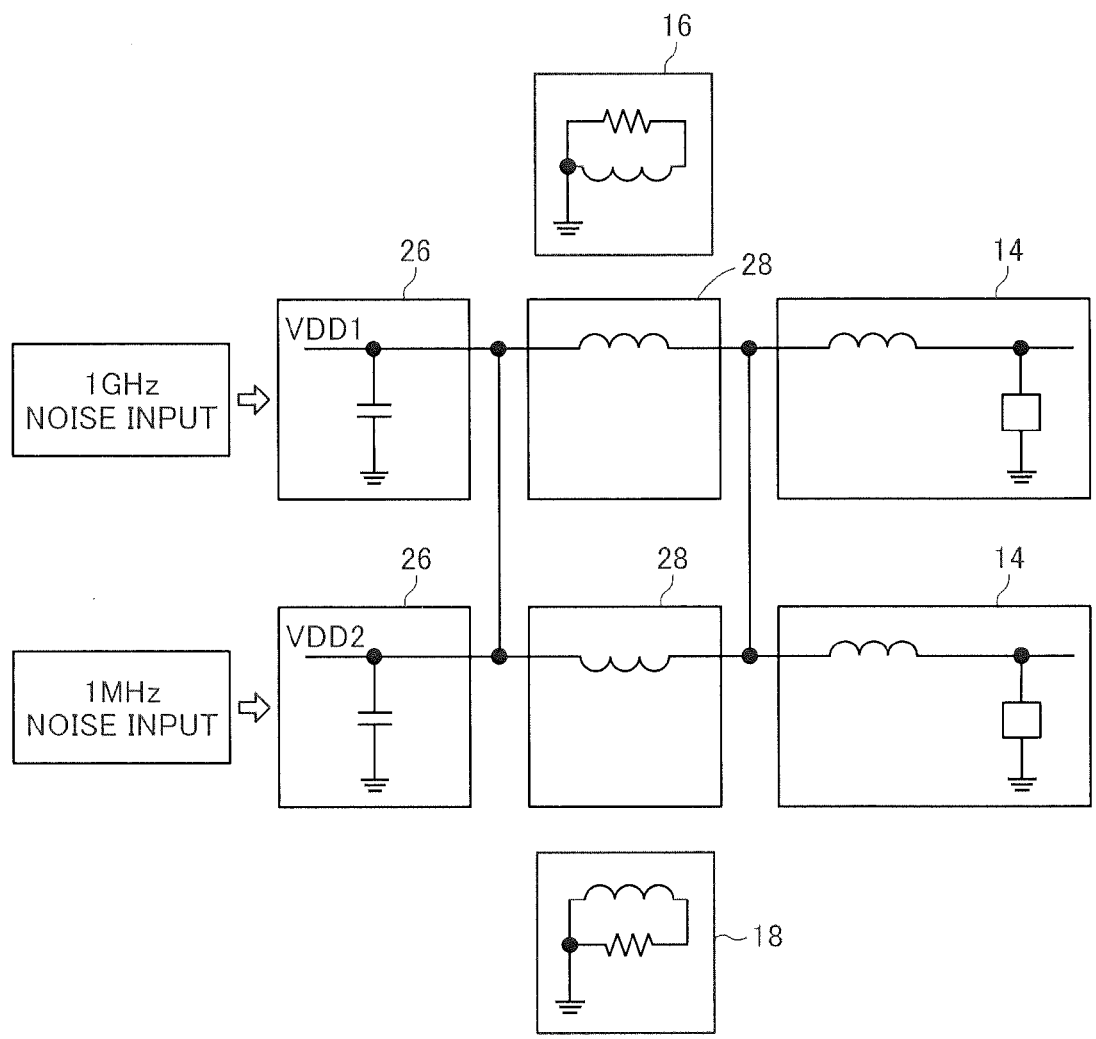
FIG. 7 is a circuit diagram showing an exemplary simulation model of the power supply impedance optimizing apparatus according to one or more embodiments shown in FIG. 1.

FIG. 7 is a circuit diagram showing an exemplary simulation model of the power supply impedance optimizing apparatus shown in FIG. 1. Simulations were carried out on the cases where the power supply lines of the first and second power supplies VDD1 and VDD2 corresponding to the two pads 60 and 62 of the semiconductor chip 26 were respectively input with noise of 1 GHz and noise of 1 MHz in one simulation and input with noise of 1 GHz and noise of 10 MHz in another simulation.

Noise of 1 GHz and noise of 1 MHz were input to the power supply lines of the first and second power supplies VDD1 and VDD2, respectively, and the simulations were carried out. As a result, with the power supplies being separated, the noise of the 1 GHz component of the first power supply VDD1 did not sneak into the second power supply VDD2, and vice versa. However, the noise of the 1 MHz component of the second power supply VDD2 was transmitted to the printed board 14.

With the power supplies being connected together between the pads 60 and 62, the noise of the 1 GHz component of the first power supply VDD1 sneaked into the second power supply VDD2 whereas the noise of the 1 MHz component of the second power supply VDD2 did not sneak into the first power supply VDD1, and the noise of the 1 MHz component of the second power supply VDD2 was not transmitted to the printed board 14.

With the power supplies being connected together between the pins 64 and 66, the noise of the 1 MHz component of the second power supply VDD2 slightly sneaked into the first power supply VDD1 while the noise of the 1 GHz component of the first power supply VDD1 did not sneak into the second power supply VDD2, and the noise of the 1 MHz component of the second power supply VDD2 was not transmitted to the printed board 14.

Noise of 1 GHz and noise of 10 MHz were input to the power supply lines of the first and second power supplies VDD1 and VDD2, respectively, and the simulations were carried out. As a result, with the power supplies being connected together between the pads 60 and 62, the noise of the 1 GHz component of the first power supply VDD1 slightly sneaked into the second power supply VDD2 while the noise of the 10 MHz component of the second power supply VDD2 did not sneak into the first power supply VDD1, and the noise of the 10 MHz component of the second power supply VDD2 was not transmitted to the printed board 14.

With the power supplies being connected together between the pins 64 and 66, the noise of the 10 MHz component of the second power supply VDD2 sneaked into the first power supply VDD1 whereas the noise of the 1 GHz component of the first power supply VDD1 did not sneak into the second power supply VDD2, and the noise of the 10 MHz component of the second power supply VDD2 was not transmitted to the printed board 14.

In those simulations, it has been confirmed that with the power supplies being separated, the noise of the second power supply VDD2 side was transmitted to the printed board 14, and that with the power supplies being connected together between the pads 60 and 62 or between the pins 64 and 66, in either case, although the noise of one of the power supplies slightly sneaked into the other thereof, the noise of the second power supply VDD2 was not transmitted to the printed board 14, thus reducing the noise.

Although one of more embodiments of the present invention have been described in detail, the invention is not limited to the foregoing embodiments, and various improvements or changes may be made without departing from the gist of the invention.

Additionally, although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A power supply impedance optimizing apparatus for optimizing impedance of a power supply of a printed board on which a semiconductor device is mounted, comprising:
   a first noise detecting circuit adapted to detect noise of a first power supply by magnetic field coupling between a bonding wire of the first power supply and a bonding wire for first noise detection that is connected at a position adjacent to the bonding wire of the first power supply;
   a second noise detecting circuit adapted to detect noise of a second power supply by magnetic field coupling between a bonding wire of the second power supply and a bonding wire for second noise detection that is connected at a position adjacent to the bonding wire of the second power supply, wherein the bonding wire of the second power supply has a same voltage as the first power supply and is separated from the first power supply;
   a first switch connected between a node of a pad of the first power supply and a node of a pad of the second power supply on a semiconductor chip of the semiconductor device;

a second switch connected between a lead of a pin of the first power supply and a lead of a pin of the second power supply in a package of the semiconductor device; and a noise determining circuit adapted to:

determine a noise level of a frequency component in each of one or more frequency ranges using the frequency component in each of the one or more frequency ranges as extracted from each of the noise of the first power supply and the noise of the second power supply, and control ON/OFF state of the first switch and the second switch based on a determination result of the noise level.

2. The power supply impedance optimizing apparatus according to claim 1, wherein the noise determining circuit comprises:

two or more filters each adapted to extract the frequency component in each of the one or more frequency ranges from each of the noise of the first power supply and the noise of the second power supply; and four or more comparators each adapted to compare the extracted frequency component in each of the one or more frequency ranges with each of one or more reference voltages, wherein the noise determining circuit is adapted to:

determine the noise level of the frequency component in each of the one or more frequency ranges based on comparison results of the four or more comparators, and control ON/OFF state of the first switch and the second switch based on a determination result of the noise level.

3. The power supply impedance optimizing apparatus according to claim 1, wherein the noise determining circuit is located on the semiconductor chip of the semiconductor device.

4. The power supply impedance optimizing apparatus according to claim 1, wherein the noise determining circuit is located in the package of the semiconductor device.

5. The power supply impedance optimizing apparatus according to claim 1, wherein the first noise detecting circuit and the second noise detecting circuit are located in the package of the semiconductor device.

6. The power supply impedance optimizing apparatus according to claim 1, wherein the first noise detecting circuit is composed of:

the bonding wire for first noise detection connected at the position adjacent to the bonding wire of the first power supply, and the bonding wire of the first power supply being originally disposed in the semiconductor device, and wherein the second noise detecting circuit is composed of:

the bonding wire for second noise detection connected at the position adjacent to the bonding wire of the second power supply, and the bonding wire of the second power supply being originally disposed in the semiconductor device.

7. The power supply impedance optimizing apparatus according to claim 6, wherein the bonding wire for first noise detection is connected between a pad adjacent to another pad corresponding to the first power supply on the semiconductor chip of the semiconductor device and a pin adjacent to another pin corresponding to the first power supply in the package of the semiconductor device, and wherein the bonding wire for second noise detection is connected between a pad adjacent to another pad corresponding to the second power supply on the semiconductor chip of the semiconductor device and a pin adjacent to another pin corresponding to the second power supply in the package of the semiconductor device.

8. The power supply impedance optimizing apparatus according to claim 1, wherein when pads on the semiconductor chip of the semiconductor device are zigzag pads arranged in two rows having an outer row and an inner row in a zigzag manner, the first noise detecting circuit is composed of:

bonding wires corresponding to two adjacent pads in the outer row or two adjacent pads in the inner row as the bonding wire of the first power supply, and the bonding wire for first noise detection, and the second noise detecting circuit is composed of:

bonding wires corresponding to two adjacent pads in the outer row or two adjacent pads in the inner row as the bonding wire of the second power supply, and the bonding wire for second noise detection.

9. The power supply impedance optimizing apparatus according to claim 1, wherein a pad and a pin to which the bonding wire for first noise detection is connected are a pad and a pin which are dedicated to the bonding wire for first noise detection.

10. The power supply impedance optimizing apparatus according to claim 1, wherein as a pad and a pin to which the bonding wire for first noise detection is connected, a pad and a pin for normal operation of the semiconductor device are shared.

11. The power supply impedance optimizing apparatus according to claim 1, wherein as a pad and a pin to which the bonding wire for first noise detection is connected, a pad and a pin having a fixed DC level are shared.

12. The power supply impedance optimizing apparatus according to claim 1, wherein the first switch comprises two or more of third switches, wherein each of the third switches is connected between a node on a power supply line extending from the pad of the first power supply on the semiconductor chip of the semiconductor device and a node on a power supply line extending from the pad of the second power supply on the semiconductor chip of the semiconductor device.

13. The power supply impedance optimizing apparatus according to claim 1, wherein the second switch comprises two or more of fourth switches, wherein each of the fourth switches is connected between a lead of a power supply line corresponding to the pin of the first power supply in the package of the semiconductor device and a lead of a power supply line corresponding to the pin of the second power supply in the package of the semiconductor device.

* * * * *